Aug. 4, 1931.    E. W. ADAMS    1,816,887
AUTOMATIC ARTICLE SELECTING AND DISTRIBUTING SYSTEM
Filed June 28, 1929    7 Sheets-Sheet 1

INVENTOR
E. W. ADAMS
BY
P. C. Smith
ATTORNEY

Aug. 4, 1931.   E. W. ADAMS   1,816,887
AUTOMATIC ARTICLE SELECTING AND DISTRIBUTING SYSTEM
Filed June 28, 1929   7 Sheets-Sheet 2

Fig. 2

INVENTOR
E. W. ADAMS
BY
P. C. Smith
ATTORNEY

Aug. 4, 1931.  E. W. ADAMS  1,816,887
AUTOMATIC ARTICLE SELECTING AND DISTRIBUTING SYSTEM
Filed June 28, 1929  7 Sheets-Sheet 3
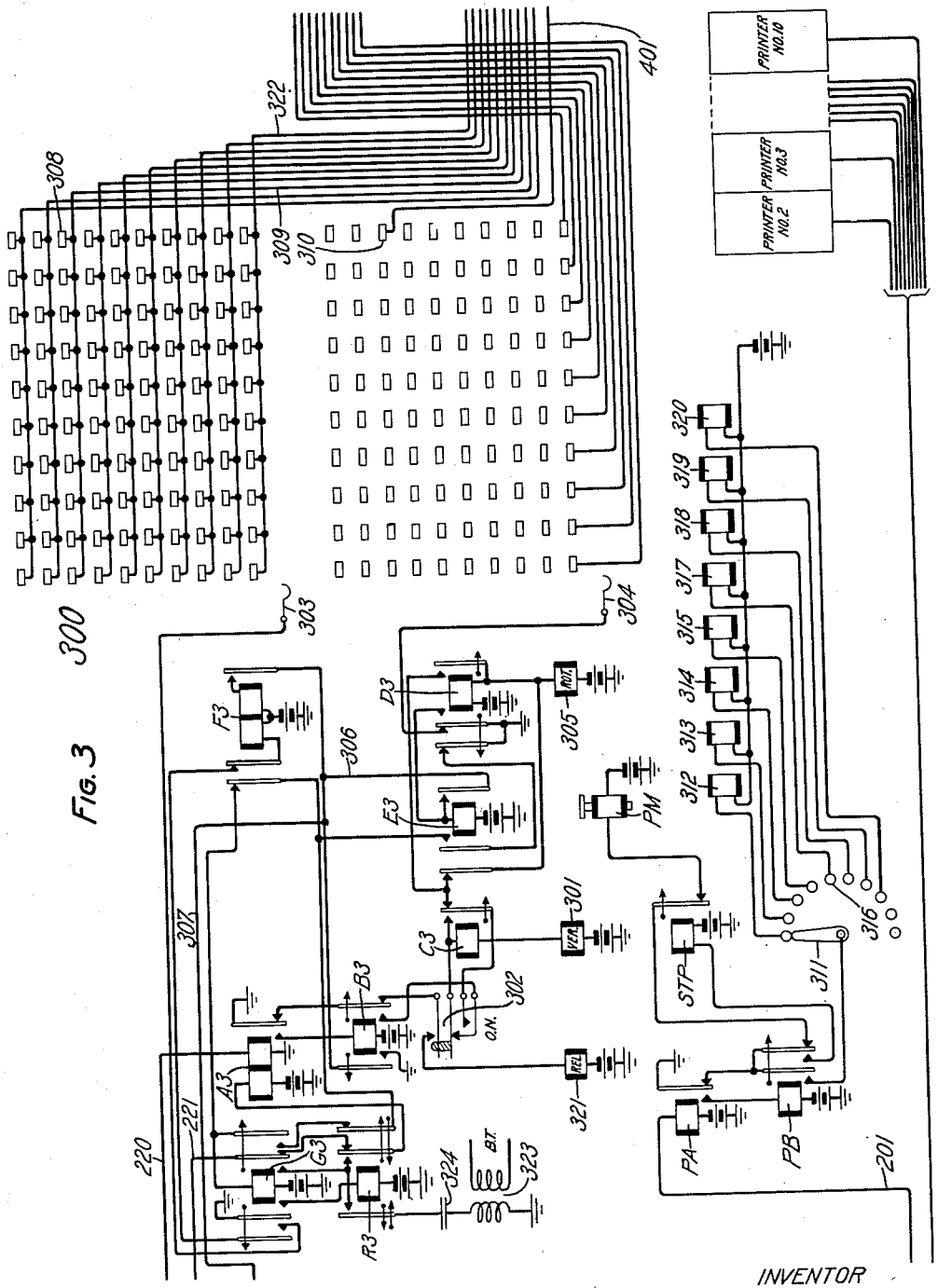
INVENTOR
E. W. ADAMS
BY
P. C. Smith
ATTORNEY

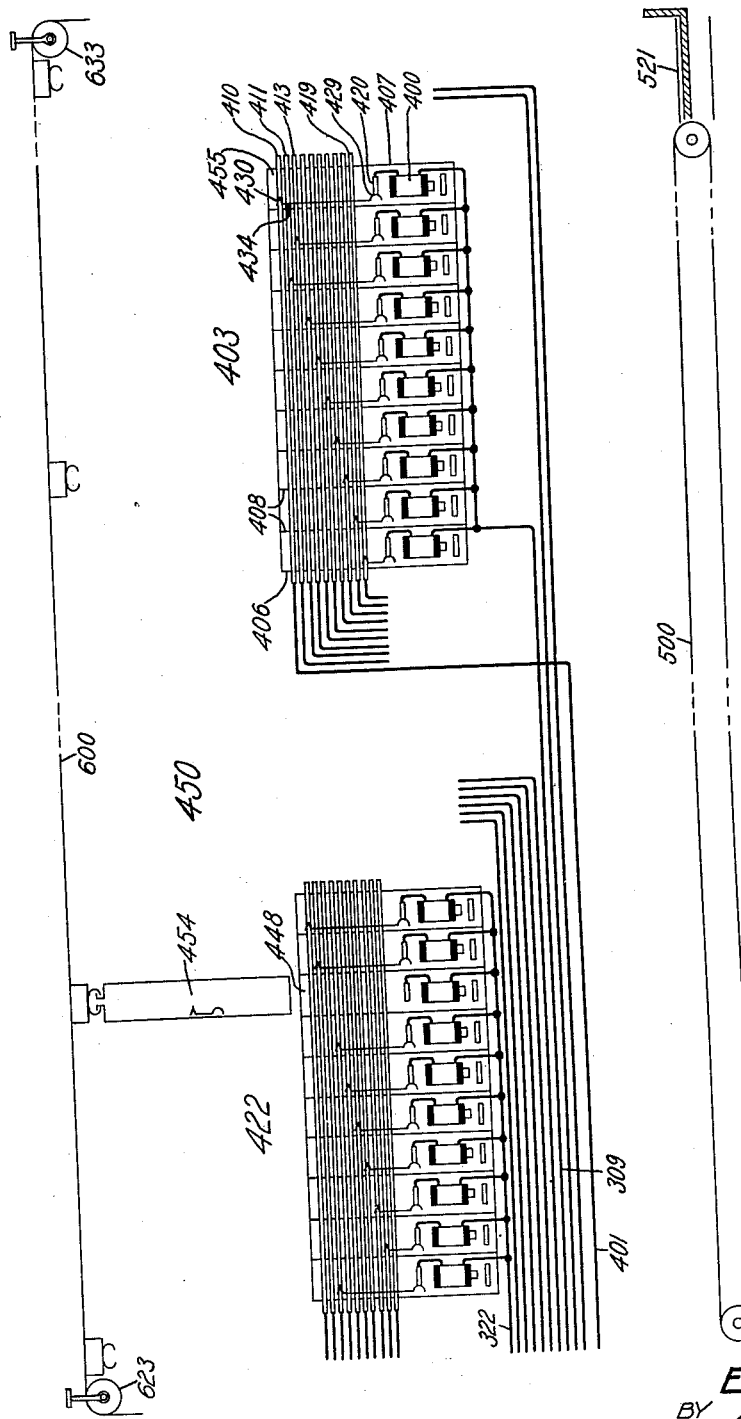

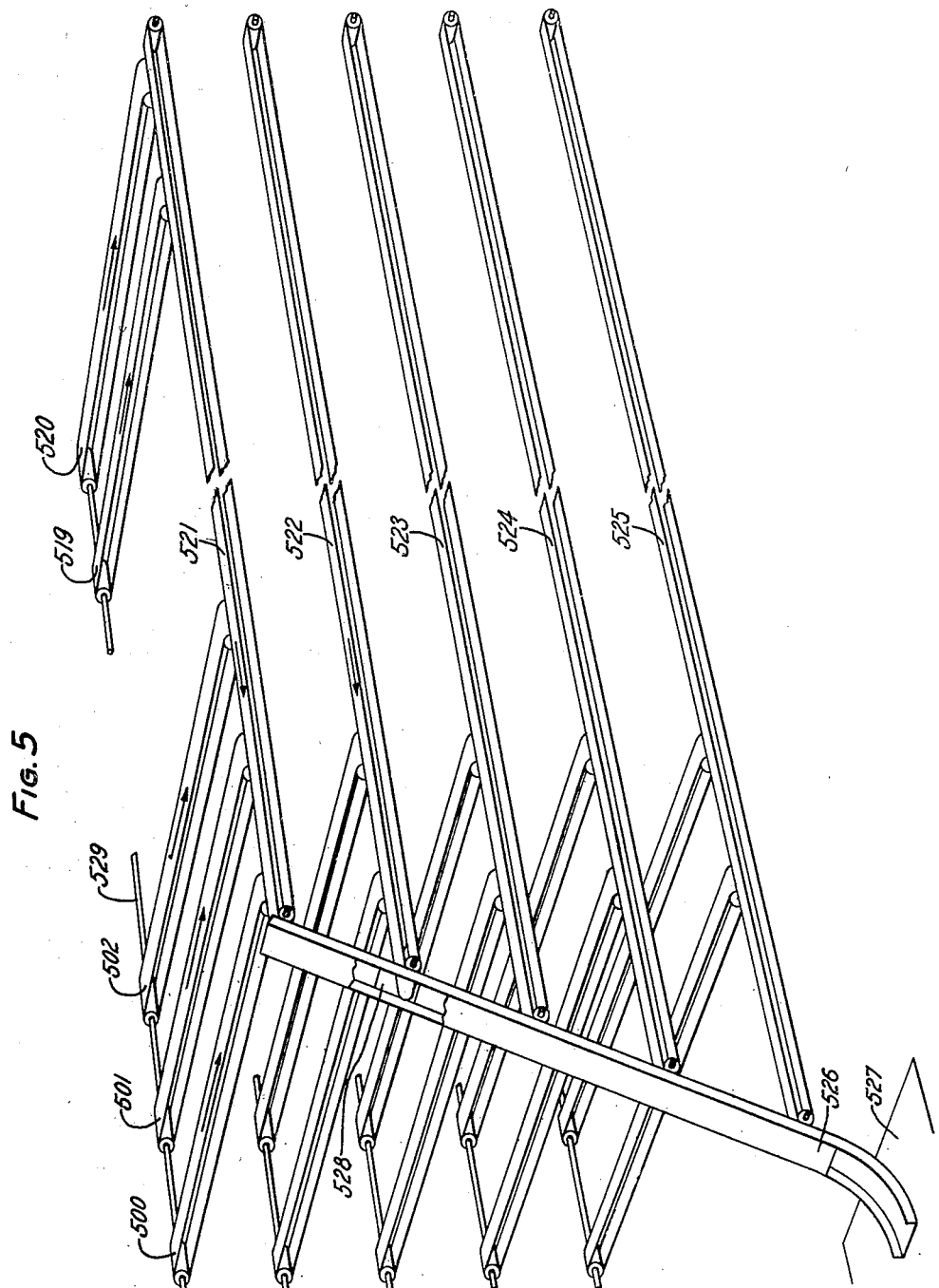

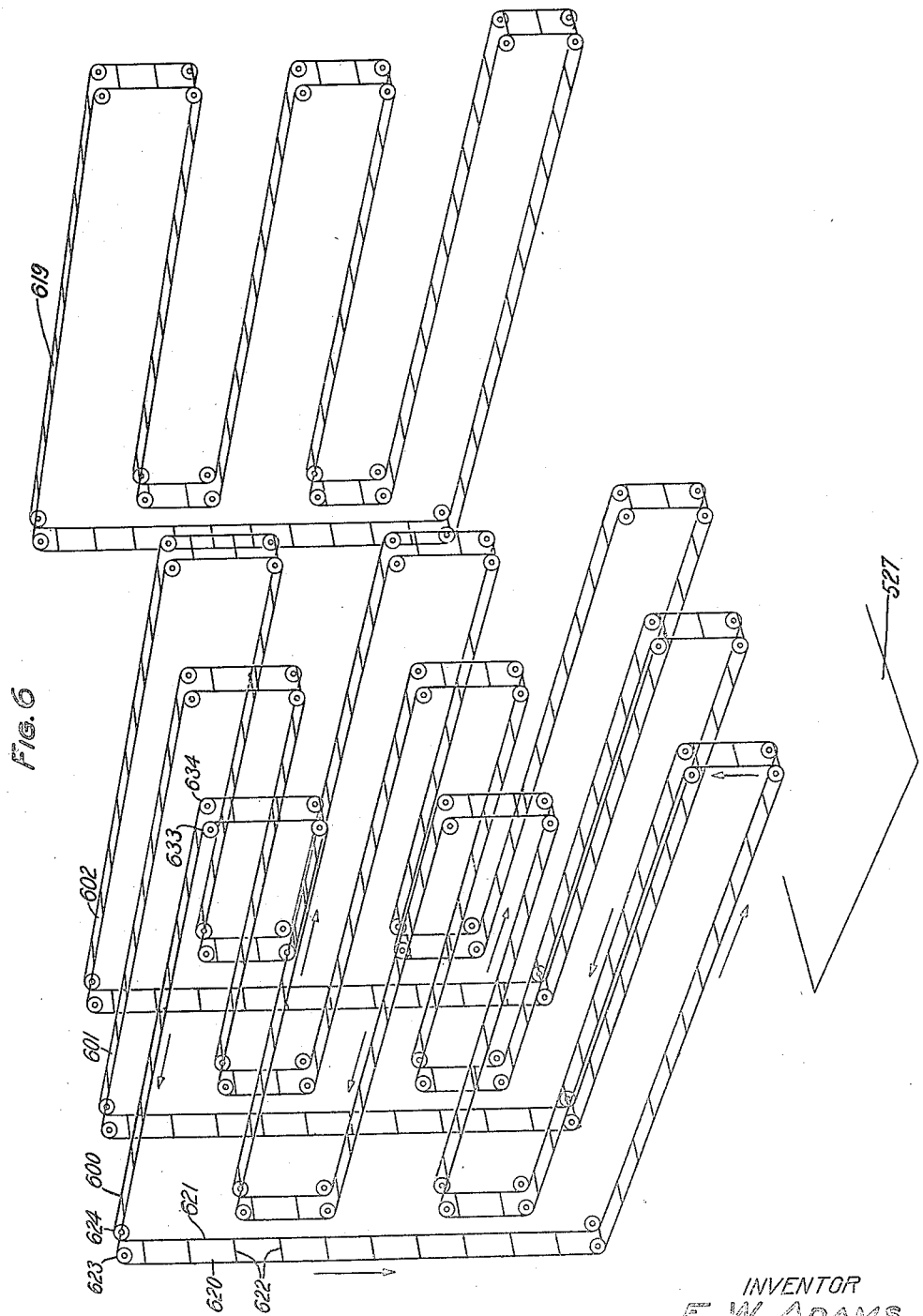

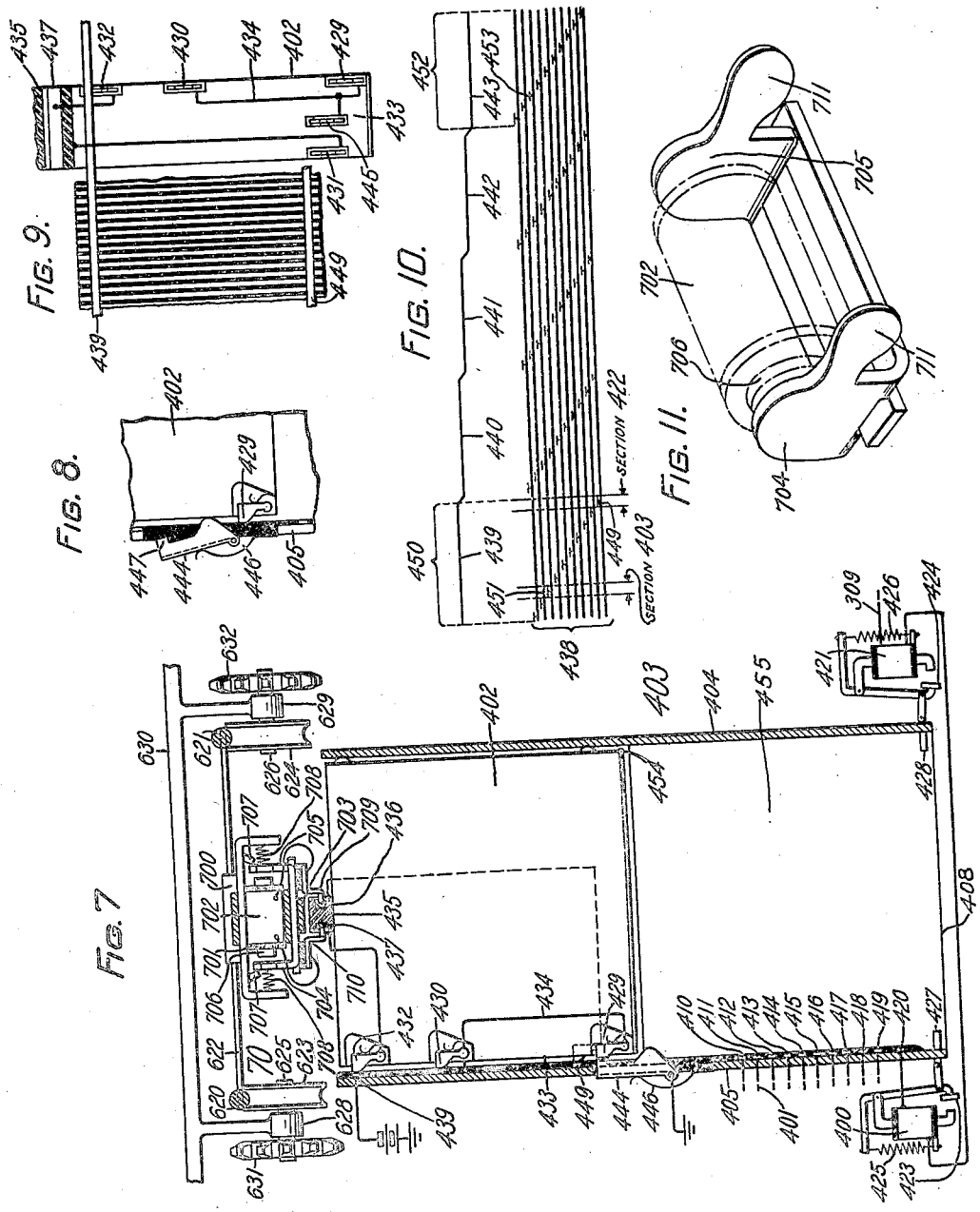

Patented Aug. 4, 1931

1,816,887

UNITED STATES PATENT OFFICE

EDGAR W. ADAMS, OF MONTCLAIR, NEW JERSEY, ASSIGNOR TO BELL TELEPHONE LABORATORIES, INCORPORATED, OF NEW YORK, N. Y., A CORPORATION OF NEW YORK

AUTOMATIC ARTICLE SELECTING AND DISTRIBUTING SYSTEM

Application filed June 28, 1929. Serial No. 374,318.

This invention relates to article selecting and distributing systems and more particularly to a system in which the selection of any desired article may be controlled from a remote point, delivered to that point or to a designated distribution station and distributed after it is no longer required, to the point of origin. The invention has for its object the attainment of automatic filing and delivery of articles whereby manual labor in connection therewith is materially reduced or substantially eliminated, greater accuracy and speed is obtained, and filing space is more efficiently utilized.

Large organizations such as, for example, libraries, insurance offices, offices of large corporations and manufacturing establishments, require very extensive filing systems in which records or other material may be filed for ready availability. For example, in a large insurance office, the number of policies which must be at all times available for reference purposes may be extremely large and require very extensive files. To maintain such an extensive filing system requires an enormous amount of clerical labor not only for preparing the material for filing but for distributing any filed material to any person in the organization who desires to consult it and to return it to the proper place in the file after it is no longer desired by the person who has requested it.

Inasmuch as manual labor is utilized for maintaining and serving such files it is essential that the filing stacks or cabinets be so positioned that they are easily within reach either from the filing floor or from short ladders and shall be in rooms which are suitably lighted, heated and ventilated to enable clerks to work therein with comfort. Thus, files which must be manually served, of necessity occupy a greater amount of and more valuable filing space than would be required if the human agency in serving them could be substantially eliminated. By substitution of machine methods of filing, delivery and distribution for the present manual methods, the provision of light, airy and heated rooms for files would not be required and basements and other hitherto unsuitable space could be rendered available for file storage. Furthermore with the elimination of manual labor except for the inspection and maintenance of the mechanism employed, the necessity for so installing the files that they may be within easy reach of filing clerks would no longer exist and, therefore, the full ceiling height of file rooms could be utilized.

In accordance with the present invention it is proposed to service filing systems by utilizing apparatus for selecting any desired file, which functions in a manner somewhat similar to the selection of a telephone line in a machine switching telephone system and to deliver the selected file to a conveyor system which will deliver the selected file or article either to the point which initiated its selection or to some designated distribution station.

In the well-known machine-switching telephone system, a subscriber to extend a connection from his line to the line of a desired subscriber dials the directory number of the desired subscriber's line, thereby setting a train of automatic selector switches to build up a connection over alternative trunk routes. Considering, for example, a step-by-step machine switching system of the well-known type having a capacity of 10,000 lines, the lines are divided into main groups of 100 lines each and appear in the terminal banks of 100 groups of connector switches. Thus, to establish a connection with a line whose number may be assumed to be 0480, a calling subscriber first dials the thousands digit 0, thereby setting a first selector switch to select an idle second selector having access to the zero thousands group of lines, then dials the digit 4, thereby setting the selected second selector to select an idle connector having access to the fourth hundreds group of 100 lines in which the desired line terminates and finally dials the tens digit 8 and the unit digit 0 to set the selected connector to the 8th level of its bank and to the 10th terminal in that level to which the line 0480 is connected.

In the system of the present invention it is proposed to use similar selector switch mechanism but instead of terminating subscribers' lines in the terminal banks of the connector switches to terminate lines therein extending to individual files which are arranged in groups similar to the grouping of telephone lines. Thus, a calling subscriber desiring a particular file which might contain any desired article such as records, a library book, piece parts, etc., would dial a number assigned to that particular file and by means of the selector mechanism would extend the connection to such file by means of which the contents of that file would be released to a conveyor system and thence delivered either directly to the calling station or to a common delivery station from which it might be delivered by the usual messenger service. Provision is also made for giving the calling party a suitable busy signal in case the file or article desired is not at the time available.

As an adjunct to the organization by means of which the desired file or article is selected and delivered to a common delivery station, provision is also made for printing a record of the designation of the file selected and the identification of the person calling for that file, whereby a proper charge of the file may be made and information made available for the use of the messenger in delivering the file to the person who has called for it. This is accomplished by the provision of a printing mechanism automatically controlled in the setting of the file selecting switches to print the number of the file dialed and controlled by additional digits dialed by the person calling, to print the line number of the calling line. In the event that the desired file or article is not in the files when dialed for, provision is made in the printing mechanism for recording that the file is out, in order that it may be located if the call is urgent.

In order that files or articles may be returned to their proper places in the file stacks a selective conveyor system is also provided so that the manual replacement thereof is obviated.

In the system of the present invention one embodiment of which has been disclosed herein by way of example, the automatic filing service may be made available to as many calling stations as desired but it will be assumed that service to 200 stations is sufficient. Ten first selectors would then be sufficient to provide simultaneous service to all stations. These ten selectors are paired with ten 200 point line finders, each of which has access to the 200 stations. Assuming further that it is required that but 10,000 filed articles or files need be available, each of the ten first selectors then has access to ten groups of second selectors of ten selectors each, and each second selector then has access to ten groups of ten connectors each. Thus, 100 groups of connectors would be utilized each having access to 100 files. Obviously if the number of filed articles is increased additional selecting stages may be introduced between the second selector and connectors and the number of connectors also increased. Thus, to extend the capacity of the system to a million field articles, first, second, third and fourth selecting switches would be required in advance of the connectors and 10,000 groups of connectors each having access to 100 filing units would be necessary.

If as illustrated herein a calling party desired a file designated No. 0480 he will first close his station circuit in any suitable manner and thereupon his line becomes automatically connected by means of an idle line finder to a first selector. He then proceeds to dial the No. 0480 thereby setting the selected first selector to select an idle second selector in the No. 0 thousands group, an idle second selector to select a connector in the fourth hundreds group and to set the selected connector upon line 80 in the group of 100 lines terminating in such connector. Incidental to the selection and setting up of the connection a printed ticket is made of the file No. 0480 which has been called for. The connector then tests the line extended to the desired file and if the file is out of the stacks a suitable busy signal is transmitted to the calling line and a busy indication is also printed on the ticket. Should the file be in the stacks and no busy signal be transmitted, or out of the stacks but the calling party be particularly desirous of locating it, he may then proceed to dial his station number which will cause such a number to be also printed on the same ticket with the dialed file number. This complete ticket then serves as a charge for the file called for in case it is available, or as information for the attendant in locating the desired file for the particular party indicated on the ticket if the ticket indicates that the required file is not in the file stack.

Upon the seizure of the file selected, if it is available, the file is released from the stack and delivered to a local conveyor which is illustrated as serving ten sub-groups of files each containing ten files or a total of 100 files. From the local conveyor the file is delivered to other conveyors which deliver it to the attendant's station whereupon by reference to the printed ticket the attendant may route the file by the usual messenger service to the station of the party who has called for it. Obviously the conveyors can be arranged to selectively deliver the file directly to the station which called for it.

After the file has been consulted and is no longer needed it is returned to the attendant's station by messenger service or otherwise where the charge ticket is canceled and then the file is placed upon distributor conveyors and automatically returned to that portion of the file stack from which it was initially taken.

Referring to the drawings in which one embodiment of the invention has been disclosed, Fig. 1 shows two calling stations and a line finder capable of connecting with 200 calling stations.

Fig. 2 shows a first selector switch and the diagrammatic representation of a second selector switch for further extending connections from calling stations.

Fig. 3 shows in the upper portion thereof a connector switch for terminating connections, in the lower left portion one of a plurality of printing devices for printing tickets to record the number of the file to which a connection has been extended over the switches of Figs. 1, 2 and 3 and the number of the calling station, and in the lower right portion thereof the diagrammatic representation of other printing devices.

Fig. 4 shows the file-releasing circuits of two of the sections of files to which the connector switch of Fig. 3 has access and a portion of the delivery and distributing conveyors serving the sections of the files.

Fig. 5 shows in perspective an assembly of conveyors for delivering any selected file to a central delivery station.

Fig. 6 shows in perspective an assembly of conveyors for distributing files from the central delivery station to their proper places in the file stack.

Fig. 7 shows in cross-section a portion of a file section, associated distributing conveyor and selective mechanism for releasing a file from the conveyor when such file has been positioned adjacent its proper position in the file stack.

Fig. 8 is a detail of the tripping dog carried by each section compartment for tripping a file from the distributing conveyor showing the dog in the position which it assumes when the file is in its proper compartment.

Fig. 9 is a detail showing the end of a file and the circuit wiring of certain of the contact devices carried thereby.

Fig. 10 shows in development the arrangement of the bus-bars on a tier of file sections for tripping a file from the distributing conveyor.

Fig. 11 shows a detail of a trip magnet carried by a distributing conveyor.

Fig. 12 is a diagram showing the manner in which Figs. 1 to 4 inclusive should be arranged to disclose the complete circuits for selecting a desired file.

Figure 1:
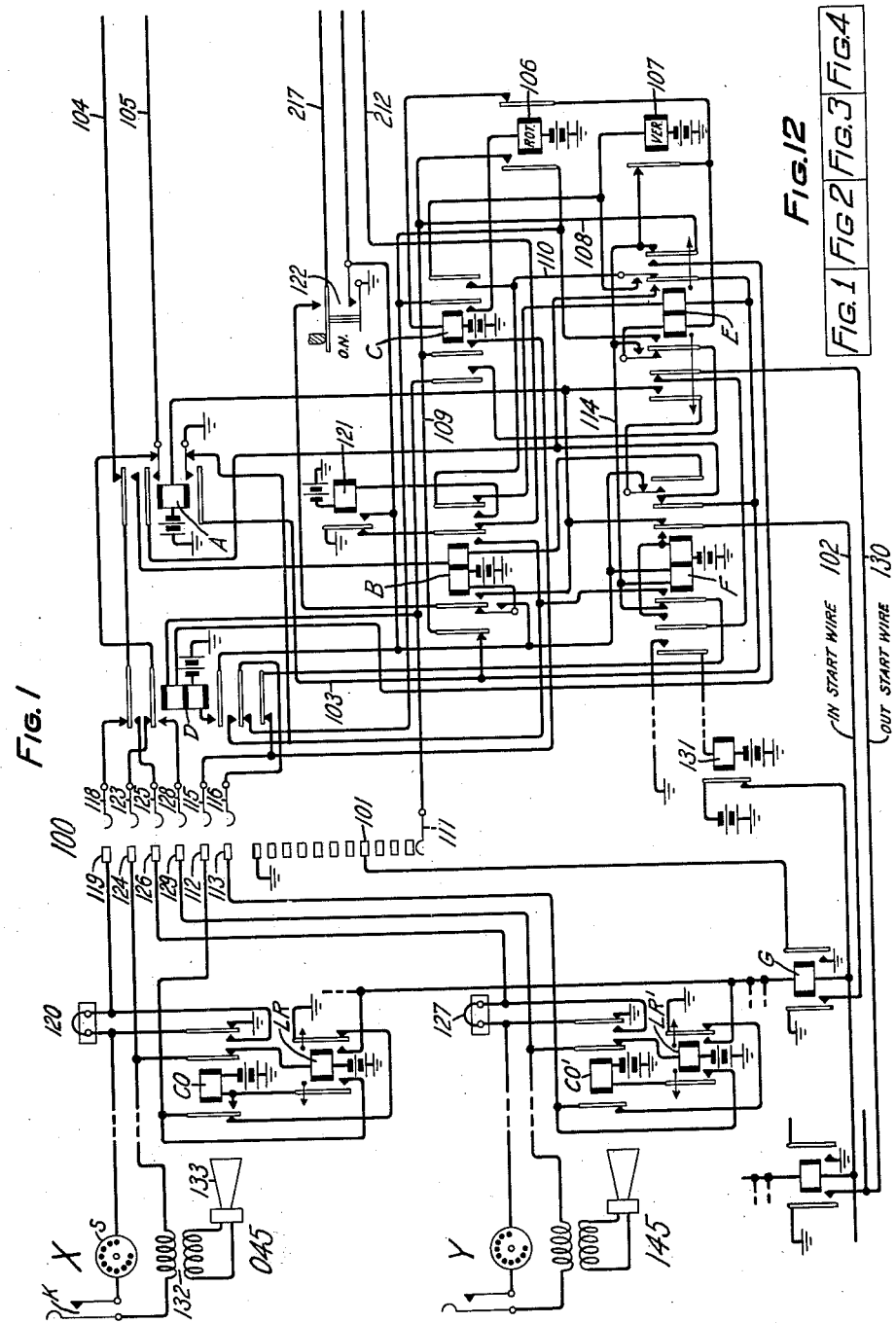

Each calling station, such as those shown in Fig. 1, is equipped with a calling dial of the type commonly used in automatic telephone systems, a key for closing the station circuit, and an audible responsive device for signaling the calling party when a file, which he has selected, is not available.

The line-finder 100, shown in Fig. 1, may be of the type disclosed in Patent No. 1,542,383, issued June 16, 1925 to A. E. Hague. This line-finder is designed to make connection with any one of 200 station lines and is paired with the first selector switch shown in Fig. 2. In order that several calls may be simultaneously made by several station lines, a group of ten paired line-finders and first selectors, similar to the switches 100 and 200, is provided.

The first selector 200 of Fig. 2 is in general similar to the selector shown in Fig. 2 of the patent referred to above. The trunk circuit incoming to the first selector 200 has, however, been slightly modified for the purposes of this invention.

The second selector 250 may be of the type shown in the patent to E. Jacobsen No. 1,558,812, issued October 27, 1925.

The connector switch 300 of Fig. 3 is in general similar to the connector switch shown in Fig. 2 of patent 1,612,991, issued January 4, 1927 to R. F. Stehlik, being, however, modified for the purposes of this invention. The connector has access to one hundred files arranged in ten sections of ten files each. It will be assumed that the filing system has a capacity of 10,000 files and that, therefore, one hundred groups of connectors similar to connector 300 are provided, each group of connectors comprising ten connectors, the bank terminals of which are multipled to the same one hundred files whereby ten simultaneous calls may be made to the same group of one hundred files. Thus one thousand connectors would be provided. Since each of the ten first selectors 200, the one hundred bank terminals of which are cross-multipled, has access to ten groups of ten selectors each, one hundred second selectors, similar to selector 250, would also be provided.

The printing devices shown in the lower portion of Fig. 3 are each similar to the printing device shown in Patent No. 1,423,898, issued July 25, 1922 to G. A. Yanochowski. Ten of these printing devices are provided and located at the central delivery station, one printing device being provided for each of the ten line-finder-first selector pairs so that a printed ticket may be made for any one of ten simultaneous calls initiated by any one of the 200 calling lines.

A clearer understanding of the invention may be had from the following detailed description of the manner in which a calling station X, whose number is assumed to be 045, calls for a file whose number is assumed to be 0480. The calling party at station X to initiate a call depresses the key K, thereby closing a circuit for the line relay LR in turn causing the operation of group relay G. Relay G at its left contacts grounds the in-start wire 102 and at its right contacts grounds commutator terminal 101 corresponding to the group of twenty lines in which the calling line is located. Relay A is now operated in a circuit which may be traced from ground on conductor 102, over the inner right back contact of relay F to battery, through the winding of relay A. Relay A disconnects the brushes of the line-finder from the tip and ring conductors 104 and 105 and closes an operating circuit for the impulse relay A1 of the first selector which may be traced from ground at the lower front contact of relay A, over conductor 103, the intermediate right back contact of relay F, the inner upper front contact of relay A, conductor 105, through the winding of relay I, the inner lower back contact of relay D1 to battery, through the left winding of relay A1. Relays I and A1 operate, relay A1 closing a circuit for slow-to-release relay B1 extending from ground at the upper back contact of relay D1, the right front contact of relay A1 to battery, through the winding of relay B1. Relay B1 interposes a break in the line-finder release conductor 217 and prepares the circuits of the first selector 200 to receive impulses from the calling line dial S. Relay I upon energizing establishes a circuit for impulse relay PA of the printing device of Fig. 3, extending from ground over the contacts of relay I, and conductor 201, to battery through the winding of relay PA. Relay PA operates and closes an obvious circuit for the slow-to-release relay PB.

Relay A also starts the vertical hunting movement of the line-finder 100 by operating relay C in a circuit extending from battery, through the winding of relay C, over back contacts of the rotary magnet 106 and vertical magnet 107, the outer right back contact of relay E, conductors 108 and 109, the outer left back contact of relay B, conductor 103, to ground at the lower front contact of relay A. Relay C upon operating closes the circuit of vertical magnet 107, extending from battery, through the winding of magnet 107, the outer right front contact of relay C, conductor 110, the inner right back contact of relay E, to ground on conductor 103. The vertical magnet 107 at the end of the stroke of its armature, opens the circuit traced for relay C which, upon releasing, opens the circuit of magnet 107. This cycle continues until the group commutator brush 111 reaches the calling group commutator segment 101 when a holding circuit for relay C is established from battery, through the winding of relay C, the back contact of rotary magnet 106, left winding and inner left normal contacts of relay E, the outer left front contact of relay C, brush 111, segment 101, to ground at the right contacts of group relay G. Relay C being held operated arrests the further vertical stepping of the line-finder, and relay E, which is slow-to-release, operates and locks over a circuit extending from battery, through the winding of the vertical magnet 107, the inner right continuity contacts of relay E, conductor 110, the outer right back contact of relay B, the right winding of relay E to ground on conductor 103. Relay E connects ground on commutator segment 101 over brush 111, the outer left front contact of relay C, the inner left front contact of relay E, the inner right front contact of relay C to battery, through the winding of rotary magnet 106.

Magnet 106 operates and at the end of the stroke of its armature opens the holding circuit of relay C. Upon the first rotary movement of the switch shaft the initial circuit of magnet 106 is opened through the movement of brush 111 from the segment 101 so that the further energization of magnet 106 will depend upon the idle or calling condition of the individual test terminals corresponding to terminals 112 and 113. The test terminals 112 and 113 of all lines are normally grounded at the right back contacts of their line relays such as LR and LR'. The corresponding lines terminating in the upper and lower terminals banks of the line-finder are tested simultaneously. If both are non-calling, ground on the upper terminal 112 short-circuits relay F in a circuit extending over the lower back contact of relay D, inner left back contact and left winding of relay F to off-normal ground at contact 122, and operates relay C. The circuit of relay C may be traced from battery, through the winding of relay C, the book contact of rotary magnet 106, the back contact of vertical magnet 107, conductor 114, the inner left back contact of relay F, the lowermost back contact of relay D, brush 115, a terminal corresponding to terminal 112 of the first line of the upper group, to ground at the back contact of the line relay LR of that line. Ground encountered by test brush 116 on a terminal corresponding to terminal 113 short-circuits the upper winding of relay D and establishes an operating circuit for rotary magnet 106 extending from ground at the back contact of the line relay of that line corresponding to relay LR' appearing in the first set of terminals in the level of the lower group selected through the vertical movement of the line-finder, thence over a test terminal corresponding to terminal 113, brush 116, the intermediate lower back contact of relay D, the inner right front contact of relay C, to battery through the winding of the rotary magnet 106.

The rotary magnet 106, upon closing its left contacts, locks itself in a circuit extending from battery, through the winding of magnet 106, the inner right front contact of relay C, the left contacts of magnet 106, conductor 109, the outer left back contact of relay B to ground on conductor 103 and at the end of the stroke of its armature, opens at its right contacts the circuit of relay C which thereupon releases and opens the circuit of magnet 106. This cycle continues as long as grounded or non-calling terminals, corresponding to terminals 112 and 113, are encountered by the test brushes 115 and 116. When the calling line is reached, assuming that the line X is the calling line, the test brush 115 will find no ground on terminal 112 since the line relay LR of that line is operated and, therefore, no circuit will be closed for the rotary magnet 106 and, consequently, the finder does not hunt further in its rotary movement. The absence of ground on terminal 112 removes the shunt from the winding of relay F and relay F now operates in a circuit extending from battery, through the winding of relay C, back contacts of magnets 106 and 107, conductor 114, the left winding of relay F to ground at off-normal contacts 122.

When relay F operates a circuit is closed for relay B extending from battery, through the winding of relay A, over the outer left contacts of relay E, outer right front contacts of relay F, right winding of relay B, uppermost front contacts of relay A, upper back contacts of relay D, brush 118, terminal 119, conductor 120 to ground at the outer right back contact of cut-off relay CO. Relay B operates locking over its left winding and inner left alternate contacts to ground at off-normal contacts 122, and establishes a circuit for cut-off relay CO extending from battery, through the winding of relay CO, the left contact of relay LR, terminal 112, brush 115, the lower back contact of relay D, the inner left front contact of relay F, the inner right front contact of relay B to ground at the back contact of release magnet 121. Relay CO, at its inner right back contact, disconnects the line relay LR which deenergizes in turn releasing relay G, and at its left front contact locks itself to ground at the back contact of release magnet 121. Relay LR is slow-to-release to give relay CO time to operate and lock. Relay CO upon removing ground at its outer right back contact opens the circuit previously traced, through the windings of relay B and A releasing relay A. Relay A upon releasing restores the continuity of the tip and ring conductors 104 and 105 and, since relay D has not operated, said conductors are extended from the calling line X over terminals 119 and 124 and brushes 118 and 123 to the first selector of Fig. 2. Relay B at its outer right back contact opens the locking circuit of relay E which thereupon releases.

Had the line Y called instead of the line X, terminal 113 instead of terminal 112 would have been ungrounded. Although relay C operates in this case due to ground on terminal 112 as previously described and at its inner right contacts connects the rotary magnet 106 to the terminal 113, this magnet does not operate since no ground is present on terminal 113. Due also to the absence of ground on terminal 113, there is no shunt about the winding of brush shifting relay D and relay D operates in a circuit extending from battery, through the winding of rotary magnet 106, the inner right contact of relay C, the inner left front contact of relay E, the outer left contacts of relay C, the upper winding of relay D, the outer right front contact of relay E, conductors 108 and 109, the outer left back contact of relay B to ground on conductor 103. The rotary magnet will not operate in this circuit. Relay D upon energizing opens at its lower back contact the shunt about the left winding of relay F which thereupon operates as previously described to connect relay A to the brush 125 in series with the right winding of relay B in a circuit which may be traced from battery, through the winding of relay A, the outer left contacts of relay E, outer front contacts of relay F, right winding of relay B, uppermost front contact of relay A, upper front contact of relay D, brush 125, terminal 126, conductor 127 to ground at the outer right back contact of relay CO'. Relay B operates as before described, locks and establishes a circuit for the cut-off relay CO' extending from battery, through the winding of relay CO', left contacts of relay LR', terminal 113, brush 116, the intermediate lower front contact of relay D, the inner right front contact of relay B to ground at the back contact of release magnet 121. Relay CO' at its inner right back contact disconnects the line relay LR' which deenergizes in turn releasing relay G and at its left front contact locks itself to ground at the back contact of release magnet 121. Relay CO' upon removing ground from its outer right back contact, opens the circuit previously traced through the windings of relays A and B, releasing relay A and since relay D is operated, the conductors 104 and 105 are extended over brushes 125 and 128 and terminals 126 and 129 to the calling line Y. In a manner previously described relay B upon operating releases relay E.

Should another call be now initiated in the same sub-group of twenty lines in which lines X and Y are located with relay F energized and relay E released, ground applied to the in start wire 102 by the group relay G, will be extended over the inner right front contact and intermediate left front contact of relay F, the intermediate left back contact of relay E to the out start wire 130 extending to the next idle line-finder normally assigned to another group of twenty lines and such line-finder is started. Relay 131 is provided to disconnect battery from all group relays G of which there would be ten when all ten line-finders serving the ten groups of lines are all busy. This relay is operated in a circuit including the outer left contacts of relays F of the operated finders in series.

Returning to the first assumption that the line X called, it will be recalled that upon the initial operation of relay A, relays A1 and B1 of the first selector of Fig. 2 operated. When the relay A released the impulse relay A1 was held operated over line X over the inner upper continuity contacts of relay A. Relay A now follows the dial impulses from the dial S and each time it releases a circuit is established from ground at the uppermost back contact of relay D1 to energize the vertical magnet 202 in series with the slow-to-release relay C1 which latter relay remains energized during the first series of impulses. It has been assumed that the calling party dials the thousand digit 0 and that, therefore, the vertical magnet 202 steps the brushes 203, 209 and 207 ten steps to the tenth level of the terminal bank.

Upon the first vertical step the off-normal switch 204 is operated and relay E1 is energized over a circuit extending from battery, through the winding of relay E1, the lower contacts of off-normal switch 204, the alternate contacts of relay C1, to ground at the right contacts of relay B1 to prepare the rotary stepping circuit. After the termination of the transmission of the thousand digit 0, relay A1 remains energized and relay C1 deenergizes. Relay E1 is at this time held energized in a circuit traced as before over the lower contacts of off-normal switch 204, the back contact of rotary magnet 205, the left contacts of relay E1 to ground at the uppermost back contact of relay D1. Relay C1 upon releasing now closes a circuit for the rotary magnet 205 extending from battery, through the winding of magnet 205, the right contacts of relay E1, the normal contacts of relay C1 to ground at the right contacts of relay B1. Magnet 205 upon energizing in this circuit advances the brushes 203, 209 and 207 into engagement with the first set of terminals of the tenth level of bank terminals and at its contacts opens the holding circuit of relay E1 which thereupon releases in turn releasing magnet 205.

If the trunk terminating in the first set of bank terminals is busy, there will be a ground on the terminal encountered by test brush 207 which shunts relay D1 and reoperates relay E1 in a circuit extending from ground, over brush 207, the lowermost back contact of relay D1, the lower contacts of the 11th rotary step switch 211, the back contacts of magnet 205, the lower contacts of off-normal switch 204 to battery, through the winding of relay E1. Relay E1 thereupon operates again establishing the circuit of rotary magnet 205 which in turn opens the circuit of relay E1. This cycle continues until the brush 207 engages the test terminal 208 of an idle trunk extending to the second selector 250. At that time no shunt exists for relay D1 and this relay operates in a circuit extending from battery, through the winding of relay E1, thence as traced over the lower contacts of switch 211, through the winding of relay D1 to ground at the right contacts of relay B1. Relay E1, being marginal, does not operate in series with relay D1.

Relay D1 closes the dialing circuit from the trunk conductors 104, 105, over its inner upper and lower front contacts, brushes 203 and 209, thence over terminals 206 and 210, through the windings of the impulse relay (not shown) of switch 250, corresponding to relay A1 and cuts the windings of relay A1 from connection with trunk conductors 104 and 105. At its lower front contact relay D1 closes a holding circuit for itself extending over brush 207 and terminal 208 to ground at the second selector 250. Upon the disconnection of relay A1 it deenergizes in turn releasing relay B1, which being slow-to-release, holds relay D1 energized until after a holding ground is applied over terminal 208 to brush 207 from the second selector.

In response to the second digit 4 dialed by the calling party, the second selector 250 is set in the manner previously described in connection with the setting of the first selector to select an idle trunk terminating in the fourth level of its bank extending to the connector 300 of Fig. 3. Upon the extension of the connection to the connector the tip and ring conductors of the calling line are extended over brushes 214, 215 and terminals 218, 219 of second selector 250, to conductors 220 and 221, conductor 220 extending directly to ground through the right winding of relay A3 and conductor 221 extending over the inner right back contacts of relays R3 and G3 to battery through the left winding of impulse relay A3. Relay A3 energizes and establishes an obvious circuit for slow-to-release relay B3, thereby preparing the circuits of the connector for response to dial impulses and connecting a holding ground over the left contacts of relay B3 to the sleeve terminal 222 of the second selector, thence over sleeve brush 223 for holding the first and second selectors.

In response to the dialing of the third digit 8, relay A3 follows the dial impulses and in response to the first impulse, closes a circuit for the vertical magnet 301 which may be traced from battery, through the winding of magnet 301, the winding of slow-to-release magnet C3, the normal contacts of off-normal switch 302, the right front contact of relay B3 to ground at the back contact of relay A3. Relay C3 and magnet 301 operate in this circuit, magnet 301 advancing the brushes 303 and 304 one step vertically. When the switch shaft has advanced one step the off-normal switch 302 operates establishing a new circuit for relay C3 and magnet 301, extending over the right front contact of relay B3, the lower alternate contacts of switch 302, the front contact of relay C3 to battery, through the windings of relay C3 and magnet 301. In response to succeeding impulses of the third digit dialed, the magnet 301 continues to step the switch shaft vertically. Relay C3, being slow-to-release, remains energized until after the termination of this series of impulses when it deenergizes.

When the calling party dials the last digit, which was assumed to be 0, relay A3 following the dial impulses, establishes a circuit for the rotary magnet 305, which may be traced from battery, through the winding of magnet 305, and the winding of relay D3, in parallel, the outer left back contact of relay E3, the back contact of relay C3, the lower alternate contacts of switch 302, the front contact of relay B3, to ground at the back contact of relay A3. In response to the dial impulses, magnet 305 advances the brushes 303 and 304 over the selected eighth level of bank contacts to the tenth terminal thereof. Relay D3, which is slow-to-release, also operates, locks over its right contacts directly to the back contact of relay C3, remaining operated during the transmission of this series of impulses, and closes at its inner left front contact an obvious circuit for relay E3.

Relay E3 operates and locks over its right contact and conductors 306 and 307 to ground at the left contacts of relay B3 and at its outer left back contacts opens the operating circuits of relay D3 and magnet 305 to prevent further operation of magnet 305. A connection has now been established from the calling line X to the terminals of the circuit extending to file No. 0480. As soon as relay D3 releases following the transmission of the last series of impulses, a circuit is established for relay G3 extending from ground at the outer left back contact of relay D3, over the inner left front contact of relay E3, the outer left back contact of relay F3, through the winding of relay G3 to battery. Relay G3 upon energizing establishes an obvious circuit for relay R3, prepares at its outer left contacts a circuit for relay F3, locks itself in a circuit extending from battery through its winding and outer right contacts, the outer right back contact of relay R3, the inner left contacts of relay E3 to ground at the outer left contacts of relay D3, and at its inner right back contact opens the pulsing circuit previously traced through the windings of relay A3 and the winding of relay I. Relay R3 which is slightly slow to operate and release upon operating opens the locking circuit of relay G3 and reestablishes the pulsing circuit through the windings of relays A3 and I, conductor 221 now being connected to the left winding of relay A3 over the inner right front contacts of relays G3 and R3. Relay I has thus been controlled to transmit one impulse to the stepping relay PA of the printer of Fig. 3 for a purpose to be later described. The operation of relay A3 at this time is ineffective.

Relay D3 upon deenergizing also establishes a test circuit through the left winding of test relay F3 for determining if the file called for is available. This test circuit may be traced from battery, through the left winding and inner left back contact of relay F3, over the outer left contacts of relay G3, brush 303, bank terminal 308, conductor 309, winding of trip magnet 400, contact 420, contact device 429, conductor 434, contact device 430, bus-bar 410, conductor 401, bank terminal 310, brush 304 to ground at the inner left back contact of relay D3. It will first be assumed that the desired file is in the file section 403 and that magnet 400 and test relay F3 operate in this circuit. Magnet 400 upon operating releases the desired file 402 from the compartment 455 of the section 403 which file then drops upon the conveyor belt 500 for delivery to the cross conveyor 521, from which it is delivered to the central delivery station 527 of Fig. 5.

Relay F3 upon energizing locks over its right winding and right front contact to ground on conductor 307, opens at its inner left back contact its initial operating circuit and at its outer left back contact opens the operating circuit of relay G3 which thereupon deenergizes in turn releasing relay R3. Relay G3 upon deenergizing opens the previously traced pulsing circuit at its inner right front contact thereby releasing relay I to repeat a second impulse to the printer, and opens the circuit of relay R3 which also releases after a short interval. With both relays G3 and R3 deenergized the pulsing circuit through relay I is again established.

An explanation will now be given of the manner in which a printed ticket to record the number of the file desired by the calling party and to record the line number of the calling party for the purpose of making a record for charging purposes is made. In response to the dialing of each digit of the desired file number, which has been assumed to be 0480, relay I, which is included in the dialing circuit, also responds. In response to the dialing of the first digit 0, relay I repeats the ten impulses to the relay PA which at its back contact establishes a circuit extending from ground, through the inner front contact of slow-to-release relay PB, brush 311 and the normal terminal of its bank to battery through the winding of magnet 312. Magnet 312 thus steps the printing wheel controlled thereby ten steps to position the numeral 0 thereon beneath the printing platen carried by the magnet PM. Relay PA also establishes a circuit over the outer front contact of relay PB to battery through the winding of stepping magnet STP which, being slow-to-release, is maintained energized during the series of impulses. At the termination of the first series of impulses, relay PA is maintained steadily energized whereupon magnet STP deenergizes and advances the brush 311 into engagement with the second terminal of its bank.

In response to the second series of impulses dialed, the relay PA operates the printing wheel magnet 313 to position the numeral on the printing wheel controlled thereby beneath the printing platen and upon the termination of this series of impulses the brush 311 is advanced another step in the manner previously described. In a similar manner in response to the last two series of impulses dialed by the calling party, printing wheel magnets 314 and 315 are operated to position the numerals 8 and 0 beneath the print platen, following which the brush 311 is advanced into engagement with terminal 316.

It will be recalled that upon the completion of the connection to the desired file, the file having been assumed to be available, relay G3 was operated and then released, in turn causing relay I to release and reoperate twice. Relay I upon releasing opens at its left contacts the circuit previously traced extending from ground over conductor 201 to battery through the winding of relay PA, thus causing the operation of printing wheel magnet 317 to advance the printing wheel controlled thereby two steps. This printing wheel has now been advanced to position the designation "F" beneath the printing platen. Upon the release of relay G3 followed by the release of relay R3 relay I remains energized and the circuit previously traced for relay PA is again closed and maintained for a sufficient period to permit the stepping magnet STP to advance the brush 311 one step into engagement with the next terminal of its bank. The printing device is now in a condition to record the number of the calling line.

The calling party now proceeds to dial his own line number which was assumed to be 045. In response to the dialing of this line number relays I and A3 again respond but since relay E3 is at the time operated, the operation of relay A3 is without effect to control further stepping of the connector switch. Relay I, however, in responding to the impulses of the first digit 0, causes relay PA to follow the dial pulses to operate the printing wheel magnet 318 to advance the printing wheel controlled thereby ten steps for positioning the numeral 0 beneath the printing platen. In a similar manner in response to the dialing of the remaining digits 4 and 5 of the calling line number, the printing wheel magnets 319 and 320 advance their respective printing wheels to position the numerals 4 and 5 respectively beneath the printing platen.

Following the dialing of his own line number, the calling party releases key K to restore the operated apparatus to normal. The release of key K opens the dialing circuit through the windings of relays I and A3 whereupon these relays release. The release of relay A3 opens the circuit of relay B3 which at its left contacts removes ground from conductor 307 thereby releasing relays E3, F3, and G3 and removes ground from sleeve terminal 222 for the purpose of releasing the second selector 250 and the first selector 200. At its right back contact with relay A3 deenergized relay B3 closes a circuit for the release magnet 321 of the connector 300 which may be traced from ground at the back contact of relay A3, over the right back contact of relay B3, the upper contacts of off-normal switch 302 to battery through winding of magnet 321. Magnet 321 operates thereby restoring the switch shaft of the connector to normal. When the connector switch shaft reaches normal, off-normal switch 302 is restored to its normal position thereby opening the circuit of magnet 321.

Upon the disconnection of ground from sleeve terminal 222, the second selector 250 releases in the manner described in Patent No. 1,558,812 referred to hereinbefore. The removal of ground from terminal 222 also removes ground from terminal 208 thereby destroying the holding circuit of relay D1 of the first selector 200 which thereupon deenergizes and closes a circuit for release magnet 216 which may be traced from battery, through the winding of magnet 216, the intermediate contacts of off-normal switch 204, the left back contacts of relay B1, the back contact of relay A1 to ground at the uppermost back contact of relay D1. Release magnet 216 upon energizing causes the restoration of the switch shaft of the first selector to normal in which position the off-normal switch 204 opens the circuit of magnet 216.

The release of relay D1 also closes a release circuit for the line-finder 100 which may be traced from ground at the uppermost back contact of relay D1, over back contacts of relays A1 and B1, conductor 217, the upper contacts of off-normal switch 122, the inner left front contact of relay B to battery through the winding of relay A. Relay A operates disconnecting the brushes of the line-finder from trunk conductors 104 and 105 and establishes a circuit for release magnet 121 which may be traced from battery, through the winding of magnet 121, the outer right front contact of relay B, the inner right back contact of relay E, conductor 103 to ground at the lower alternate contacts of relay A. Magnet 121 upon operating restores the finder switch shaft to normal whereupon the circuit of relay A is opened at the off-normal switch 122. The off-normal switch 122 also opens at its contacts the holding circuits of relays B and F and these relays release. The circuits of all selector switches employed in the connection have now been restored to normal.

At the time relay I release in response to the release of key K the circuits of relays PA and PB were opened and with stepping magnet STP deenergized, a circuit is established for the printing magnet PM extending from battery, through the winding of PM, back contacts of magnet STP, back contacts of relays PB and PA to ground. Magnet PM upon operating through a printing platen controlled thereby presses a tape against the printing wheels to print the record set up on the printing wheels. The magnet PM at the end of its stroke also causes the release of the printing wheels and the release of brush 311, thereby restoring the printing device to its normal condition. The operation and restoration of the printing device are fully described in the patent to Yanochowski, 1,423,898 referred to hereinbefore. A record 0480F045 has thus been made of the number of the file called for, the fact that it was free or available and should be charged to the calling party, and of the number of the party to whom the file should be charged and delivered. When the file has been delivered by the conveyor system to the central delivery station, the attendant at that station may file the printed record in her charge index and cause the file to be delivered by messenger service to the calling party designated on the printed record.

In the foregoing discussion it was assumed that the file called for was available. It will now be assumed that when the connection was established to the desired file that it was not in the file stack and that, consequently, test relay F3 of the connector did not operate. When, therefore, relay G3 operated to close the circuit of relay R3, relay G3 is maintained operated since its circuit is not again opened at contacts of relay F3. Relay G3 upon operating therefore opens the circuit of relay I and when relay R3 operates the circuit of relay I is again established and maintained. Relay I therefore opens the circuit of relay PA in the manner previously described once to advance the printing wheel, controlled by magnet 317, one step. Following the single opening of the circuit of relay PA, since relay G3 remains energized, the circuit of relay PA is maintained closed long enough to permit the release of magnet STP to advance brush 311 to the next terminal of its bank in readiness for registering the first digit of the calling line number. The printing wheel controlled by magnet 317 has thus been advanced to a position to expose the designation "B" beneath the printing platen.

Since relays G3 and R3 are maintained energized, a circuit is closed from the secondary of busy tone coil 323, through condenser 324 over the left contacts of relay R3, the inner right contacts of relay G3 to trunk conductor 221, thence over the calling line loop through the primary of repeating coil 132, returning over trunk conductor 220, thence to ground through the right winding of relay A3. Busy tone current flowing in this circuit is induced through the secondary winding of repeating coil 132 and the responsive device 133 to apprise the calling party that the file is not available. If he is desirous of having the file located for him, he may then proceed to dial his own number to complete the record at the printing device and then restore the connection by opening key K in the manner previously described. In this case the printed charge record will contain the record 0480B045 of the file called for, the fact that it is out of the file stack, and the number of the party who called for it. The attendant at the central station may then take steps to locate the file for the calling party. If the calling party does not urgently desire the particular file for which he has called, he will restore the circuits by releasing key K without dialing his line number and the printed record will then only comprise the number of the file called for and the fact that it was not available. The clerk at the delivery station seeing that no calling line number is recorded on the record, will then know that the call was not urgent.

It has been assumed that the filing system has a capacity of 10,000 files. These files are arranged in sections of ten files each, ten sections in a horizontal row, each horizontal row of sections being served by a connector such as is shown in Fig. 3. Five horizontal rows of sections may be arranged in a tier. Thus each tier of sections would accommodate five hundred files and twenty such tiers would be required to accommodate 10,000 files. In Fig. 4 the first and 8th sections 422 and 403 of a horizontal row 450 in a tier have been illustrated together with a local delivery conveyor 500 serving that horizontal row of sections and a portion of the distributing conveyor 600. In Fig. 5 one embodiment of the complete delivery conveyor system for the entire twenty tiers of filing sections has been illustrated. This conveyor system comprises a local delivery belt or conveyor, such as 500 positioned beneath each horizontal row of file sections, five main belts or conveyors 521 to 525 inclusive and a delivery chute 526, common to the five main conveyors, for receiving files from the main conveyors and delivering them to the central delivery station 527. For clarity of illustration the filing sections and associated distributing conveyors have been omitted from this figure. It will be noted that the local conveyors 500 to 520 inclusive of the uppermost horizontal rows of file sections of all twenty tiers have access to the upper main conveyor 521 so that any file selected from the sections of these rows are delivered to the main conveyor 521 and thence over the chute 526 to the station 527. Similarly, the local conveyors of the other corresponding rows of sections in each tier have access respectively to the main conveyors 522 to 525 inclusive. To permit files to be delivered from the main conveyors to the chute 526 the main conveyors project slightly into the chute through openings 528 therein. While no power mechanism has been disclosed for operating the several conveyors, it is to be understood that they would all be driven in the direction indicated by the arrows shown in Fig. 5 from a common source of power connected, for example, to the common driving shaft 529.

Referring now to Figs. 4 and 7 an explanation will be given of the manner in which a particular file may be selected from a selected file section. In the previous description it was assumed that file No. 0480 was selected from file section 403. In accordance with the arrangement of file sections, previously described in connection with Fig. 5, this section will be eighth in the fifth horizontal row of the first tier. Each section, such as 403, shown in Fig. 7, comprises side walls 404 and 405 joined by end walls 406 and 407 and partitions 408, thereby dividing each section into ten compartments, each compartment being of sufficient size to receive a file such as 402. The tops and bottoms of all compartments are left open. Insulatively supported on the inside of wall 405 and extending the entire length of the section are ten bus-bars 410 to 419 inclusive and individual to each compartment of the section there is a contact segment such at 420. As shown in Fig. 4 the bus-bars 410 to 419 inclusive are connected respectively to terminals in the eighth level of the lower bank of connector 300.

Suitably mounted on the side walls 404 and 405 of the section 403 are 10 pairs of magnets, one pair of magnets for each compartment. For example, the pair of magnets associated with compartment 455 is shown at 400 and 421. These magnets have their windings connected in series in a circuit extending from the contact segment 420 of the compartment, over conductor 309 to strapped terminals in the eighth level of the upper bank of connector 300. It will be noted that the ten pairs of magnets serving section 403 are similarly connected to conductor 309 and that the magnets serving the first section 422 of the same horizontal row of sections are similarly connected over conductor 322 to strapped terminals of the first level of the upper bank of connector 300. The magnets 400 and 421 are provided with armatures 423 and 424 respectively normally retracted by springs 425 and 426. The armatures 423 and 424 are connected to slidable stop pins 427 and 428 which project through the walls 405 and 404 of the compartment and upon which the file 402 rests when it is within the compartment and by which it is retained therein.

Each file, for example, file 402, is provided with five spring-operated contact devices 429, 430, 431, 432 and 445 insulatively mounted in recesses in the end wall 433 of the file, the contact devices 429 and 430 being electrically connected by conductor 434. When the file 402 is in its compartment the contact device 429 engages the contact 420 and the contact device 430 engages the bus-bar 410, thus completing the circuit previously traced from conductor 401, over bus-bar 410, contact 430, conductor 434, contact device 429, segment 420, windings of magnets 400 and 421 to conductor 309. It is to be noted in this connection that the other nine files which are filed in the other nine compartments of the section 403 have their contact devices corresponding to 429 and 430 differently spaced so that when these files are in other compartments, circuits are completed from the individual contacts of their compartments, corresponding to contact 420, to the bus-bars 411 to 419 respectively. The files allocated to all other sections of the file stack have their corresponding contact devices similarly arranged, as, for example, as shown in section 422 of Fig. 4. To enable articles or papers to be readily inserted and withdrawn from the file, the bottom of the file may be hinged as shown at 454 in Fig. 7.

For distributing files which have been returned to the central station to their proper compartments in the file stack, an arrangement of distributing conveyors is employed. This arrangement of distributing conveyors has been illustrated diagrammatically in Fig. 6. For clarifying the illustration the file sections and associated delivery conveyors have been omitted from this figure. By reference to Fig. 6 it will be noted that twenty distributing conveyors or belts 600 to 619 inclusive have been illustrated, except that belts 603 to 618 are omitted to simplify the drawings. The belt 600 serves the first tier of five horizontal rows of sections, belt 601 serves the second tier, etc. Each belt comprises two parallel members 620 and 621 interconnected at intervals by cross rods 622 and supported on guide wheels such as 623, 624, etc. The belt 600 travels in the direction indicated by the arrows and passes upwardly from a point over the central delivery station 527, thence over the first horizontal row of sections in the first tier, thence upwardly and over the second horizontal row of sections, thence upwardly and over the third horizontal row of sections, upwardly and over the fourth horizontal row of sections, thence upwardly and over guide wheels 633 and 634 and over the fifth horizontal row, thence downwardly over guide wheels 623 and 624, back to the starting point. Additional supporting guide wheels may be supplied as necessary to support the belts at intervals where they extend horizontally over the rows of file sections.

In Fig. 7 a pair of the guide wheels 623 and 624 is shown. These guide wheels are individually supported on shafts 625 and 627, mounted in bearings 628 and 629 formed on the supporting bracket 630. Although no driving mechanism has been disclosed for driving the several conveyors belts, it is obvious that driving sprocket wheels such as 631 and 632 could be attached to the shafts 625 and 626 and that these sprocket wheels could be connected by sprocket chains to a common drive shaft for driving all of the conveyor belts in unison at such a speed that files could be attached to the belts for distribution while the files are in motion or each belt could be individually driven to be stopped and started at will to enable the attachment of files.

One manner in which files may be attached to the conveyor belts is disclosed in detail in Fig. 7. At spaced intervals along each belt magnetic clutches are attached to certain of the cross rods 622. Each clutch comprises a base member 700 to which is attached the magnet yoke 701 of the magnet 702. Slidably supported in the extension 703 of the base 700 are two armatures 704 and 705 which are normally held away from the pole-pieces of the core 706 of the magnet 702 against the back stops 707 formed integrally with the yoke 701 by springs 708 attached to the armatures and to the downturned ends of the yoke 701. The arrangement of the sliding armatures is more clearly disclosed in Fig. 11. Insulatively attached to the armatures 704 and 705 respectively are clutch members 709 and 710 which are adapted to engage in grooves in the lug 435 attached to the upper wall of each file such as 402 and are connected respectively to the terminals of the winding of magnet 702. The lug 435 is formed of insulating material and is provided with grooves in which are embedded conducting plates 436 and 437 adapted for electrical contact with the clutch members 710 and 709 for a purpose to be hereinafter described.

It will be noted from the arrangement of the armatures 704 and 705 that the springs 708 normally tend to move the armatures with relation to each other in such a manner that the clutch members 709 and 710 tend to move toward each other. To enable the clutch members to be separated from each other to such an extent that they may be engaged in the grooves of the lug 435 of a file, the armatures are provided with extensions 711 as shown in Fig. 11 which, when pressed toward each other manually, will separate the clutch members 709 and 710 sufficiently to enable the lug 435 of a file to be inserted therebetween. When the extensions 711 are released the clutch members are then moved toward each other through the action of springs 408 to firmly engage the conducting plates in the grooves of the lug 435 thereby suspending the file from the conveyor belt.

Referring to Figs. 7, 8, 9 and 10 a description will now be given of the manner in which a file is selectively released from the conveyor belt when it reaches a position over the compartment of the stack section in which it should be filed. Although the stack sections of the horizontal rows of sections 450, shown in Fig. 4, have been disclosed as separated from each other, they would preferably be placed contiguous to each other with the side walls 404 and 405 of the several sections in alignment or extending integrally throughout the length of the row of sections. By reference to Fig. 7 it will be noted that these side walls 404 and 405 are extended upwardly to form guides between which the files are moved by the conveyor belt.

Insulatively supported on the inside of the extension of wall 405 of a row of sections is a group of ten bus-bars 438, including bus-bars 449 and 451 the uppermost bus-bar extending throughout the length of the first section of the row, the next lower bus-bar extending throughout the length of the second section of the row, etc. A single bus-bar 439, also insulatively supported on the inside of wall 405, extends throughout the entire length of the horizontal row of sections. The other horizontal rows of sections of a tier are similarly equipped with bus-bars. The group of bus-bars 438 of each horizontal row of sections of a tier are multipled together as shown diagrammatically in Fig. 10 and the bus-bars 439 to 443 inclusive of the five horizontal rows of sections of each tier are staggered as disclosed in Fig. 10. These bus-bars are all interconnected and connected to battery. To better disclose the arrangements of these bus-bars they have been shown in Fig. 10 as though the horizontal rows of the tier were in the same horizontal plane rather than above each other.

As the conveyor belt advances an attached file between the guide walls 404 and 405 of horizontal rows of sections of the tier, the contact device 432, carried by the file, engages the bus-bar 439 of the horizontal row of the tier in which the file should be filed and the contact devices 431 and 445 engage the bus-bar of the group 438 of the section of the horizontal row of the tier in which the file should be filed. It will be noted by reference to Figs. 7 and 9, that the contact device 432 is electrically connected to the conducting plate 437 of the lug 435 and that the contact device 431 is connected to the conducting plate 436 of the lug 435, thereby connecting the winding of magnet 702 in an electrical circuit between the contact device 432 and the contact device 431.

Pivotally and insulatively mounted in the wall 405 of each compartment is a dog 444 which is pressed by the spring 446 into the position illustrated by Fig. 7 when the file has been removed from the compartment in such a position that its extension 447 will be engaged by the contact device 429 carried by the file, when the file has been advanced to a position immediately over such vacant compartment. When the file enters the compartment the dog 445 is cammed into the position illustrated in Fig. 8 in which position the extension 447 is out of the path of other files which may be moved over that compartment by the conveyor belt. It will now be assumed that the file 454, whose number is 0410, is to be returned to the file stack. This file belongs in the first section of the upper horizontal row of sections of the first tier of the file stack. The operator noting from the number that it belongs in the first tier of the stack, attaches the file to a clutch on the conveyor belt 600. This particular file has its contact device 432 so positioned that it does not make contact with any bus-bar until it has been advanced to the beginning of the upper or fifth horizontal row 450 of sections of the tier. As the file is advanced over the upper horizontal row of sections, the contact devices 431 and 445 of the file will engage no bus-bar of the group 438 until the section 422 is reached in which the particular file belongs because of the spacing of these contact devices with respect to the contact device 432. When the file has advanced over the section 422 to a position over a vacant compartment in that section, for example, compartment 448, Fig. 4, the dog 444 of which is in the position shown in Fig. 7, the contact device 429 carried by the file will engage the dog. A circuit will then be effective from battery, bus-bar 439, over contact device 432, plate 437, clutch member 710, magnet winding 702, clutch member 709, plate 436, contact device 431, bus-bar 449, contact device 445, contact device 429, dog 444 to ground. Magnet 702 energizes withdrawing the clutch members 709 and 710 from the lug 435 on the file, thereby releasing the file into such vacant compartment. From an inspection of Fig. 4 it will be noted that it does not matter which compartment of the section is vacant as the file may be selectively released from any compartment of the section by a calling party if he dials the correct number of the file and the file may be released from the distributing conveyor into any vacant compartment of the section in which it belongs.

If compartments in other sections of the tier are vacant at the time the file 454 is being distributed to its own section and the dogs of such compartments corresponding to dog 444 are in the path of contact device 429 carried by the file, the file will not be released from the conveyor belt as the circuit of magnet 702 cannot be completed until the file reaches its own filing section, and the contact device 429 will cam such dogs back and pass them by.

A file belonging in section 403 of the horizontal row 450 will, for example, have its contact device 432 positioned as shown in Figs. 7 and 9 for engagement with the row bus-bar 449, but will have its contact devices 431 and 445 positioned to engage the section bus-bar 451, corresponding to the eighth section of the row 450. Similarly, a file belonging in the eighth section of the first horizontal row 452 of the tier would have its contact device 432 positioned to engage row bus-bar 443 and would have its contact devices 431 and 445 positioned to engage the section bus-bar 453 corresponding to the eighth section of the row 452.

What is claimed is:

1. In a filing system, a calling station, a plurality of filed articles, means connected with and controlled from said calling station for selecting any one of said articles, and means for delivering said selected article to a designated point.

2. In a filing system, a plurality of calling stations, a plurality of filed articles, means connected with and controlled from any one of said stations for selecting any one of said articles, and means for delivering said selected article to a designated point.

3. In a filing system, a calling station having equipment including a calling dial, a plurality of filed articles, selector switch mechanism connected with and controlled by said dial in accordance with numbers assigned to said articles for selecting any one of said articles, and means for delivering said selected article to a designated point.

4. In a filing system, a plurality of calling stations having equipment including a calling dial at each of said stations, a plurality of filed articles, selector switch mechanism connected with and controlled by the dial of any station for selecting any desired one of said articles, and means for delivering said selected article to a designated point.

5. In a filing system, a plurality of calling stations, a plurality of filed articles, means connected with and controlled from any one of said stations for selecting any one of said articles, means for recording at a designated point the numerical designation of the article selected and of the station calling, and means for delivering said selected article to a designated point.

6. In a filing system, a plurality of calling stations, a plurality of filed articles, means connected with and controlled from any one of said stations for selecting any one of said articles, a record printing means controlled from said stations for printing a charge record of the number of the article selected and the designation of the station which has selected it, and means for delivering said selected article to a designated point.

7. In a filing system, a calling station, a plurality of filed articles, selector mechanism, a record printing device, means connected with and controlled from said calling station for simultaneously operating said selector mechanism to select any one of said articles and for operating said printing device to record the designation of the article selected, means thereafter controlled from said calling station for operating said printing device to record the designation of said calling station, and means for delivering said selected article to a designated point.

8. In a filing system, a plurality of calling stations, a plurality of filed articles, means connected with and controlled from any one of said stations for selecting any one of said articles, means for signaling the calling station if the article selected is not in the file, and means for delivering said selected article to a designated point if said article is in said file at the time of selection.

9. In a filing system, a calling station, a plurality of filed articles, selector mechanism, a record printing device, means connected with and controlled from said calling station for selecting any one of said articles, means for signaling said calling station if the article selected is not in the file, means for operating said printing device to record whether said selected article is in or out of the file, and means for delivering said selected article to a designated point if said article is in said file at the time of its selection.

10. In a filing system, a calling station, a plurality of filed articles, selector mechanism, a record printing device, means connected with and controlled from said calling station for simultaneously operating said selector mechanism to select any one of said articles and for operating said printing device to record the designation of the article selected, means for operating said printing device to record whether said article is in or out of the file, means thereafter controlled from said calling station for operating said printing device to record the designation of said calling station, and means for delivering said selected article to a designated point if said article is in said file at the time of its selection.

11. In a filing system, a file stack comprising a plurality of sections, each section being divided into a plurality of compartments, a calling station, a plurality of articles filed in individual compartments of said filing sections, said sections arranged in rows and said rows of sections arranged in tiers, means connected with and controlled from said calling station to release an article from any designated compartment, a central delivery station, and a conveyor system for delivering any released article to said central delivery station comprising a local conveyor for each horizontal row of sections, a main conveyor common to all local conveyors serving corresponding horizontal rows of sections of all tiers, and a chute common to all of said main conveyors.

12. In a filing system, a calling station, a filing stack comprising a plurality of sections, each section being divided into a plurality of compartments, a selector switch having bank terminals individual to each compartment and groups of bank terminals individual to each section, files for each of said compartments, a group of bus-bars comprising as many bars as there are compartments in a section common to all compartments of the section, each of said bus-bars being connected to an individual bank terminal of said switch, a contact segment individual to each compartment, a pair of interconnected contact devices carried by each file, the contact devices of the files allotted to the compartments of a section being progressively spaced whereby when the files are all in the compartments of a section the individual segments are connected through the contact devices of the files to different ones of said bus-bars, a trip magnet for each compartment one terminal of which is connected to the segment of such compartment, the other terminals of all magnets of a section being connected to one of said groups of terminals, and means connected with and controlled by said calling station for operating said switch to select the group terminal of a section and the individual terminal of a compartment to operate any particular trip magnet thereby releasing a desired file from its compartment.

13. In a filing system, a plurality of calling stations, a plurality of filed articles, means connected with and controlled from any one of said stations for selecting any one of said articles, means for delivering said selected article to a designated point, and means for automatically refiling said selected articles.

14. In a filing system, a plurality of calling stations, a plurality of filed articles, means connected with and controlled from any one of said stations for selecting any one of said articles, means for delivering said selected article to a designated point, and means for automatically distributing and refiling said selected articles from said designated point.

15. In a filing system, a plurality of calling stations, a file stack having a plurality of filing compartments, a file allotted to each of said compartments, means connected with and controlled from any one of said stations for selecting any one of said files, a conveyor system for delivering a selected file to a central delivery station, and a second conveyor system for selectively distributing any file from said central station and for refiling it in its allotted compartment.

16. In a filing system, a file stack having a plurality of filing compartments arranged in sections, a file allotted to each of said compartments, a conveyor for selectively conveying any file from a designated point to a point adjacent its allotted filing compartment, a clutch mechanism for attaching a file to said conveyor, and means for selectively releasing said clutch to deposit said file in its allotted compartment when said conveyor has advanced said file to a point adjacent said compartment.

17. In a filing system, a file stack having a plurality of filing compartments arranged in sections, said sections being grouped in rows, a file allotted to each of said compartments, a conveyor for selectively conveying any file from a designated point to a point adjacent its allotted filing compartment, a clutch mechanism for attaching a file to said conveyor, and means for selectively releasing said clutch to deposit said file in its allotted compartment dependent upon the movement of said file by said conveyor to the row, section and compartment of said stack to which said file has been allotted.

In witness whereof, I hereunto subscribe my name this 27th day of June, 1929.

EDGAR W. ADAMS.